United States Patent [19]

Ma et al.

[11] Patent Number: 5,854,331

[45] Date of Patent: Dec. 29, 1998

[54] BLOCK COPOLYMERS OF OXAZOLINES AND OXAZINES AS PIGMENT DISPERSANTS AND THEIR USE IN INK JET INKS

[75] Inventors: Sheau-Hwa Ma, Chaddsford, Pa.; Jose N. Rodriguez-Parada, Hockessin, Del.

[73] Assignee: E. I. du Pont de Nemours and Company, Wilmington, Del.

[21] Appl. No.: 963,839

[22] Filed: Nov. 4, 1997

[51] Int. Cl.$^6$ .............................. C08L 53/00; C08K 3/08; C08K 3/16; C09D 11/10
[52] U.S. Cl. ......................... 524/505; 523/122; 524/403; 524/439
[58] Field of Search ............................ 523/122; 524/403, 524/439, 440, 441

[56] References Cited

U.S. PATENT DOCUMENTS

| | | | |
|---|---|---|---|
| 5,272,201 | 12/1993 | Ma et al. | 524/505 |
| 5,519,085 | 5/1996 | Ma et al. | 524/505 |
| 5,571,850 | 11/1996 | Ma et al. | 523/122 |

*Primary Examiner*—Peter A. Szekely
*Attorney, Agent, or Firm*—Joseph A. Tessari

[57] ABSTRACT

Aqueous dispersions having improved stability and which are particularly well suited for use as aqueous ink jet ink compositions comprise an aqueous vehicle which comprises water or a mixture of water and an organic solvent; a particulate solid, preferably a pigment; and a polyoxazoline or polyoxazine dispersant selected from the group of AB, ABA, and BAB block copolymers wherein the A block is hydrophobic, and the B block is hydrophilic, and wherein the polymer as a whole has a solubility in the aqueous vehicle of at least 0.1 wt % at 25° C.

10 Claims, No Drawings

BLOCK COPOLYMERS OF OXAZOLINES AND OXAZINES AS PIGMENT DISPERSANTS AND THEIR USE IN INK JET INKS

BACKGROUND OF THE INVENTION

This invention relates to aqueous dispersions having excellent stability, and more particularly, to the use of such dispersions in aqueous pigmented inks for ink jet printers.

Water-based pigment dispersions are well known in the art, and have been used commercially for applying films, such as paints, to various substrates. The pigment dispersion is generally stabilized by either a non-ionic or ionic technique. When using the non-ionic technique, the pigment particles are stabilized by a polymer that has a water-soluble, hydrophilic section that extends into the water and provides entropic or steric stabilization. Representative polymers useful for this purpose include polyvinyl alcohol, cellulosics, ethylene oxide modified phenols, and ethylene oxide/propylene oxide polymers. While the non-ionic technique is not sensitive to pH changes or ionic contamination, it has a major disadvantage for many applications in that the final product is water sensitive. Thus, if used in ink applications or the like, the ink will tend to smear upon exposure to moisture. In the ionic technique, the pigment particles are stabilized by a polymer of an ion containing monomer, such as neutralized acrylic, maleic, or vinyl sulfonic acid. The polymer provides stabilization through a charged double layer mechanism whereby ionic repulsion hinders the particles from flocculation. Since the neutralizing component tends to evaporate after application, the polymer then has reduced water solubility and the final product is not water sensitive. Ideally, a polymer dispersant which could provide both steric and charged double layer stabilization forces via a designed structure would make a much more robust pigment dispersion.

Polymer dispersants having both random and block structures are known. Random polymer dispersants can be easily and cheaply prepared by the conventional polymerizaiton techniques and are available from many commercial sources. Structured polymer dispersants usually offer improved dispersion stability as compared to random polymers, but usually require a more elaborate synthetic scheme or more demanding reaction conditions and high purity of raw materials as in the case of anionic polymerization and group transfer polymerization. A more convenient and cheaper polymerization process that allows a certain structure to be built into the polymer for improved properties is desired for more advanced high quality coating applications and for meeting the very demanding needs of many new applications such as ink jet printers.

Ink jet printing is a non-impact printing process in which a digital signal produces droplets of ink on media substrates such as paper or transparency films. In thermal ink jet printing, resistive heating is used to vaporize the ink, which is expelled through an orifice in the ink jet printhead toward the substrate. This process is known as firing, in which water is vaporized by the heat, causing a very rapid and drastic local compositional change and temperature rise. This occurs repeatedly at high frequency during the life of the printhead. In the orifice areas, the ink composition can drastically change from water-rich to solvent-rich as well due to evaporation of water. This may cause the pigment particles to flocculate around the orifice in the printhead, eventually leading to plugging of the orifice in the printer mechanism from which droplets of ink are expelled. This will lead to misdirection of the ink drop or prevention of drop ejection.

In the conventional coating applications, many additives of organic nature are used to impart the desired physical properties for the final use. Examples include polymer binders, thickeners, thixotropic agents, coating aids, etc. During the drying process, these components are concentrated. The pigment dispersion needs to accommodate such changes in order to maintain the uniformity and color quality for the final coatings.

Accordingly, the need exists for dispersants which can be prepared by a convenient and cheap polymerization process and which will provide improved dispersion stability for improved coating quality and for a new application such as ink jet printers.

SUMMARY OF THE INVENTION

One aspect of the invention is to provide an aqueous dispersion having improved properties comprising:

(a) an aqueous vehicle, (b) a particulate solid, and (c) a polymeric dispersant selected from the group consisting of AB, ABA, and BAB block copolymers wherein the A block is hydrophobic, and the B block is hydrophilic, wherein the polymer as a whole has a solubility in the aqueous vehicle of at least 0.1 wt % at 25° C.;

(d) said polymeric dispersant being comprised of monomers selected from the group consisting of oxazoline monomers, oxazine monomers and mixtures thereof.

The aqueous dispersions of this invention are stable, have broad compatibility in systems containing water miscible organic cosolvents, aqueous additives such as thickeners, latex emulsions, are extremely flexible and able to adjust to system changes such as drying of the coating or the firing conditions of thermal ink jet printers, exhibit good resistance to flocculation and develop high color strength and gloss.

DETAILED DESCRIPTION OF THE INVENTION

The essential components of the aqueous dispersions of this invention are (1) an aqueous vehicle; (2) a particulate solid; and (3) a polyoxazoline or polyoxazine dispersant. Depending upon the particular application for use of the dispersion, various other additives may be present, such as humectants, viscosity modifiers, film forming agents, cosolvents, thixotropic agents, binders, coating aides, etc.

Aqueous Vehicle

The composition of the aqueous vehicle will vary greatly depending upon the ultimate use of the dispersion. The aqueous vehicle will, of course, always include water, typically deionized water. For most applications, the aqueous vehicle will also include at least one water-soluble or water-miscible organic solvent. Selection of a suitable solvents depends upon requirements of the specific application, such as desired surface tension and viscosity, the selected particulate solid, etc.

For ink jet ink applications, the aqueous vehicle comprises a mixture of water and organic solvents. Representative examples of suitable solvents are disclosed in U.S. Pat. No. 5,085,698, the disclosure of which is incorporated herein by reference. Most preferred for thermal ink jet inks is a mixture of organic solvent having at least 2 hydroxyl groups, e.g., diethylene glycol, and deionized water, with water comprising between 30% and 95%, preferably 60% to 95%, by weight based on the total weight of the ink.

Particulate Solids

The particulate solids useful in the present invention may be a pigment, colloidal silver halide, metallic flake, a herbicide, an insecticide, or biomaterials such as drugs, etc. The particular particulate solid selected must be capable of binding with the hydrophobic block of the block copolymer. Preferably, the particulate solids may have "binding sites" which will permit binding with the polymer. Most of the above-mentioned particulate solids have very specific functional groups on their surfaces which can act as binding sites.

For use in an ink jet ink or a paint, the particulate solid is a pigment or a mixture of two or more pigments. The term "pigment" means a colorant that remains in a particulate or crystalline state throughout the printing process. All carbon blacks have chemisorbed oxygen complexes, primarily acidic in nature, e.g., carboxylic, quinonic, lactonic or phenolic groups, on their surfaces to varying degrees depending on the conditions of manufacture. These acidic groups on the pigment surface provide binding sites for dispersants with basic functions such as amine. Other pigments with acidic surfaces or basic surfaces, either the pigment itself contains functional groups or their surfaces have been modified by compounds containing functional groups such as sulfonic, phosphoric, and carboxylic acid groups or amine type of basic groups, are equally useful for this invention.

Furthermore, almost all of the organic color pigments and many of the surface treatment compounds have aromatic features in their structures, providing sites for additional aromatic interactions with the dispersant. Examples of pigments which may be used to form the composition include azo, anthraquinone, thioindigo, oxazine, quinacridone, lakes and toners of acidic dye stuffs or basic dye stuffs, copper phthalocyanine and its derivatives, and various mixtures and modifications thereof.

The size of the particulate solid has an influence on the dispersion stability. Brownian motion of minute particles will help prevent the particles from flocculation and settling. The particular particle size should thus be selected to optimize the stability of the dispersion, consistent with the other requirements of the particular intended application of the dispersion.

In ink jet inks, the pigment particles need to be sufficiently small to permit free flow of the ink through the ink jet printing device, especially at the ejecting nozzles that usually have diameter ranging from 10 micron to 50 micron. In addition, it is also desirable to use small particles for maximum color strength and gloss. The range of useful particle size is approximately 0.005 micron to 15 micron. Preferably, the pigment particle size should range from 0.005 to 1 micron.

Fine particles of metal or metal oxides (such as copper, iron, steel, aluminum, silica, alumina, titania, and the like) also may be used to practice the invention and may find applications in the preparation of magnetic ink jet inks and other coating applications for the electronic industries.

Polyoxazolines and Polyoxazines

The polyoxazoline or polyoxazine dispersants for use in this invention are AB, ABA, or BAB block copolymers wherein the A block(s) is a hydrophobic block and the B block(s) is a hydrophilic block. To be useful for this invention, the polymer as a whole must have a solubility in the aqueous vehicle of at least 0.1 wt % at 25° C., preferably at least 0.5 wt % at 25° C.

Generally speaking, the 2-substituted oxazolines and the 2-substituted oxazines are hydrophilic when the substituent is a lower alkyl (e.g., methyl, ethyl) or contains hydrophilic groups (e.g., ether, hydroxyl). Similarly, these compounds become hydrophobic when the substituent is a longer chain alkyl, an aryl or similar hydrophobic group. The polyoxazoline and polyoxazine polymers have the following general formula (with the A block represented by formula A and the B block represented by formula B):

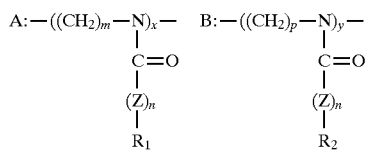

wherein x is 1–100, preferably 1–10;

y is 5–500, preferably 5–100;

y/x is 5–100, preferably 5–50;

Z is a divalent linking group represented by the formula: $R_3(L)_r$, wherein $R_3$ is an alkene or arylene group containing 2 to 10 carbon atoms, L is O, S, C(O), OC(O), (O)CO, SC(O), or $SO_2$ group and r=0 or 1;

m and p independently represent an integer of 2 (oxazolines) or 3 (oxazines);

n=0 or 1;

$R_1$ is an alkyl, aryl, aralky, or alkylaryl group containing 4 to 20 carbon atoms;

$R_2$ is an alkyl group containing 1 to 3 carbon atoms, and optionally containing one or more hydroxyl or ether groups.

It is understood that the hydrophobic A block can contain hydrophilic monomers (that is, $R_1$ can be a 1–3 carbon alkyl) and the hydrophilic B block can contain hydrophobic monomers (that is, $R_2$ can be an alkyl, arakyl, aryl, or alkylaryl group containing 3 to 30 carbon atoms). However, care must be taken that the entire A block remains hydrophobic, the entire B block remains hydrophilic, and the solubility of the dispersant as a whole is at least 0.1 wt % at 25° C.

The block polyoxazolines and polyoxazines useful in this invention can be conveniently prepared by a variety of methods known to those skilled in the art. For example, they may be prepared cationic polymerization of the following monomers using the methods described in *Prog. Polym. Sci.* Vol. 15, 751–823, 1990:

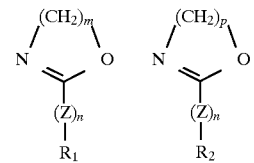

wherein Z, $R_1$, $R_2$, m and p are as described above and n=0 or 1. Effective initiators include (i) Lewis acids and their stable salts such as $BF_3OEt$, $AlCl_3$, $SbF_5$, and $Et_3O^+BF_4^-$; (ii) protonic acids such as $CF_3SO_3H$, $HClO_4$, and HBr; (iii) sulfonate esters and sulfonic anhydrides such $CF_3SO_3CH_3$, and $(CH_3SO_2)_2O$; (iv) alkyl halides such as $CH_3I$, and $C_6H_5CH_2Br$; and (v) electron acceptors such as tetracyanoethylene, and 7,7,8,8-tetracyanoquinodimethane.

The AB block copolymers may be prepared by a "one-pot two-stage copolymerization" wherein the second block monomers are added to the same reaction pot after the first block monomers are substantially converted to polymer since the cationic polymerization is a living polymerization process. Alternatively, the AB block copolymers may be prepared in a "one-pot one-stage polymerization" process wherein all monomers are added at one time into the reaction pot provided that the reactivity of the monomers in the two blocks are significantly different. The ABA and BAB triblock copolymers can be prepared by a difunctional initiator and a two-stage polymerization process starting from the center block, or a multi-stage process wherein the blocks are built sequentially from one of the ends. The polymerization can be carried out in bulk or in solution.

For polymers where x=1, an initiator having a hydrophobic group, such as benzyl bromide, can be used to polymerize 2-alkyl-2-oxazoline to give the desired AB block copolymer. Alternatively, the hydrophilic B block can be synthesized first and a hydrophobic nucleophilic compound, such as benzyl amine, is then used to terminate the living ends to provide the hydrophobic A block.

For applications in ink jet inks, the polyoxazolines or polyoxazines that are selected to advantage in practicing the invention have a number average molecular weight below 20,000, preferably below 15,000, and typically in the range of 1,000–6000. The polyoxazoline or polyoxazine may be present in the range of approximately 0.1 to 10%, preferably in the range of approximately 0.1 to 5% by weight of the total ink composition. If the amount of the polymer becomes too high, the ink color density will be unacceptable and it will become difficult to maintain desired ink viscosity.

The molecular weight limitations (if any) and useful concentration of dispersant for other applications can be determined by those skilled in the particular art of that application.

Other Ingredients

Depending on the requirements for the particular application, various types of additives can be used to modify the properties of the dispersion. Examples include organic cosolvents, coalescing agents, polymeric binders including water soluble polymers and water dispersible latex emulsions, thickeners, thixotropic agents, surfactants, coating aids, biocides, sequestering agents, etc.

For ink jet ink applications of the present dispersions, anionic, cationic, nonionic, or amphoteric surfactants may be present in the amount of 0.01–5% and preferably 0.2–2%, based on the total weight of the ink. Biocides such as Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate; sequestering agents such as EDTA; and other known additives, such as humectants, viscosity modifiers and other polymers may also be added to improve various properties of the ink compositions.

In a preferred embodiment, the present dispersions are employed as pigment dispersions for aqueous ink jet ink compositions which may be prepared in any of the conventional methods as known to those skilled in the art. The typical formulation in an ink jet ink compositions is:

aqueous vehicle: 70 to 99.8%, preferably approximately 94 to 99.8%, based on total weight of the ink when an organic pigment is selected; approximately 25 to 99.8%, preferably approximately 70 to 99.8% when an inorganic pigment is selected;

pigment: 0.1 to 30% pigment by weight for organic pigments, but generally in the range of approximately 0.1 to 15%, preferably approximately 0.1 to 8%, by weight of the total ink composition; with inorganic pigments (which have higher specific gravity), higher weight percentages are common.

dispersant polymer: approximately 0.1 to 10% by weight of the total ink composition, preferably in the range of approximately 0.1% to 5% by weight of the total ink composition.

Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosity is no greater than 20 cP, and preferably in the range of about 1.0 cP to about 10.0 cP at 20° C.

EXAMPLES

Polymer I: poly(2-ethyl-2-oxazoline)-b-poly(2-phenyl-2-oxazoline)

100 ml of o-dichlorobenzene and 1.25 gm (5 mmol) of N-methyl-2-methyl-2-oxazolinium triflate were placed under argon atmosphere into a dried round-bottomed flask equipped with an air driven glass stirrer, reflux condenser and dropping funnel. The flask was placed in an oil bath at 100° C. and 30 mL (295 mmol) of 2-ethyl-2-oxazoline were added. The reaction mixture was stirred at this temperature for 4 hours. Then, 4 mL (30 mmol) of 2-phenyl-2-oxazoline were added and the mixture was left stirring at the same temperature overnight. The following day the temperature was raised to 130° C. and the reaction continued for an additional 8 hours to finish off polymerization. After cooling to room temperature, the reaction mixture was diluted with methylene chloride and precipitated into ethyl ether. The polymer obtained was filtered off, washed with ether, and dried overnight in a vacuum oven at 50° C. The yield was 40.3 gm of polymer. $^1$HNMR indicates a 10/1 ratio of ethyl to phenyl groups in the polymer. GPC (in THF against polystyrene standards): Mn=4850, Mw=7070.

Polymer II: poly(2-phenyl-2-oxazoline)-b-poly(2-ethyl-2-oxazoline)-b-poly(2-phenyl-2-oxazoline)

100 ml of solvent o-dichlorobenzene and 1.90 gm (5 mmol) of ethylene glycol ditosylate, were placed under argon atmosphere into a dried round-bottomed flask equipped with an air driven glass stirrer, reflux condenser and rubber septum. The flask was placed in an oil bath at 100° C. and 30 mL (295 mmol) of 2-ethyl-2-oxazoline were added. The reaction mixture was stirred at this temperature for 4 hours. Then, 4 mL (30 mmol) of 2-phenyl-2-oxazoline were added and the temperature was raised to 130° C. After stirring the reaction mixture for 3 hours, the temperature was lowered back to 100° C. and the mixture was kept stirring overnight. The mixture cooled to room temperature, was diluted with methylene chloride and precipitated into ethyl ether. The polymer obtained was filtered off, washed with ether, and dried overnight in a vacuum oven at 50° C. The yield was 32.7 gm of polymer. $^1$HNMR indicates a 9/1 ratio of ethyl to phenyl groups in the polymer. GPC (in THF against polystyrene standards): Mn=7610, Mw=13900.

Polymer III: Poly(2-ethyl-2-oxazoline) with a n-dodecyl chain end 41 mL (406 mmol) of 2-ethyl-2-oxazoline and 10 mL (41 mmol) of dodecyl iodide were placed under argon atmosphere into a dried 100 mL round-bottomed flask equipped with magnetic stirring and reflux condenser. The flask was placed in an oil bath at 80° C. and the mixture was vigorously stirred. After 2 hours the reaction mixture turned dark and had solidified. The temperature was raised to 90°

C. and kept there for an additional 3.5 hours. After cooling to room temperature, the solid obtained was dissolved in chloroform and precipitated into ethyl ether. The supernatant liquid was decanted off and the solid was dried under vacuum at 50° C. 42.8 gm of a dark orange powder were obtained. GPC (in THF against polystyrene standards): Mn=3130, Mw=3990.

Polymer IV: Poly(2-ethyl-2-oxazoline)-b-poly(2-phenyl-2-oxazoline)-b-poly(2-ethyl-2-oxazoline)

20 ml of o-dichlorobenzene, 4 mL (30 mmol) of 2-phenyl-2-oxazoline, and 2.6 gm (5 mmol) of triflate salt of 1,4-bis (4,5-dihydro-2-oxazolyl)benzene were placed under argon atmosphere into a dried round-bottomed flask equipped with an air driven glass stirrer, reflux condenser and rubber septum. The flask was placed in an oil bath at 130° C. and the reaction mixture was stirred at this temperature for 6 hours. Then, an additional 80 mL of o-dichlorobenzene were added and the reaction temperature was lowered to 100° C. 30 mL of 2-ethyl-2-oxazoline were added and the mixture was stirred at this temperature for 3 more hours. After cooling to room temperature, the reaction mixture was diluted with methylene chloride and precipitated into ethyl ether. The polymer was further purified by dissolving it in a methylene chloride/methanol mixture and reprecipitating into ethyl ether. The material obtained was filtered off, washed with ether, and dried in a vacuum oven at 50° C. overnight. 23.4 gm of polymer were obtained. $^1$HNMR indicates a 9/1 ratio of ethyl to phenyl groups in the polymer. GPC (in THF against polystyrene standards): Mn=3090, Mw=4580.

Ink 1

10 gm of Polymer I was dissolved in 90 gm of deionized water to make a 10% polymer solution. Potassium hydroxide solution (45%) was used to adjust the pH to 8.0. 20 gm of FW18 carbon black pigment (Degussa Corp.) and 80 gm of deionized water were added. The above mentioned components were premixed in a plastic beaker by mechanical stirring until no lumps or dry clumps were visible. The mixture was dispersed in a microfluidizer (Microfluidics Corp.) by passing it through the interaction chamber 8 times under a liquid pressure of about 10,000 psi. The resulting pigment dispersion had a 10% pigment concentration with an average particle size of 115 nm as determined by Brookhaven BI-90 particle size analyzer. The pigment dispersion was let down with Liponics® EG-1 (Lipo Chemicals) and 2-pyrrolidone to make a black pigmented ink comprising 3.5 wt % pigment, 1.75 wt % polymer dispersant, 5.0 wt % Liponics® EG-1, and 10 wt % 2-pyrrolidone.

Ink 2

Ink 2 was prepared in the same manner as Ink 1, except that 10 grams of Polymer II were used in lieu of Polymer I and the mixture was passed through the interaction chamber 10 times. The resulting pigment dispersion had a 10% pigment concentration with an average particle size of 138 nm as determined by Brookhaven BI-90 particle size analyzer. The concentrate was let down to make an ink having the same composition as Ink 1.

Ink 3

15 gm of Polymer III was dissolved in 135.0 gm of deionized water to make a 10% polymer solution. 30 gm of FW18 carbon black pigment and 120 gm of deionized water were added. After mixing in a plastic beaker by mechanical stirring until no lumps or dry clumps were visible, the mixture was dispersed in a microfluidizer by passing it through the interaction chamber 10 times under a liquid pressure of about 10,000 psi. The resulting pigment dispersion had a 10% pigment concentration with an average particle size of 128 nm as determined by Brookhaven BI-90 particle size analyzer. The pH was 3.42. The dispersion was let down as for Ink 1 to make an ink containing 3.0 wt % pigment, 1.75 wt % polymer dispersant, 5.0 wt % Liponics® EG-1, and 10 wt % 2-pyrrolidone.

Ink 4

Ink 2 was repeated, except that 10 gm of Polymer IV was used in lieu of Polymer II. The resulting pigment dispersion had a 10% pigment concentration with an average particle size of 180 nm as determined by Brookhaven BI-90 particle size analyzer. The ink was let down as in the preparation of the Ink 2 and had the same formulation.

Ink Preparation and Testing

The inks were placed into the ink reservoir of thermal ink jet pens and loaded on a Hewlett Packard DeskJet 500C ink jet printer (Hewlett Packard Co.). A solid black area, alpha-numeric characters in various fonts, sizes, and dot patterns were printed on Gilbert bond paper (25% cotton, Mead Co.). The optical density (OD) was measured on the solid area by an X-Rite® densitomer, model 418 (X-Rite, Inc.,). The print quality (PQ) was judged on the edge acuity and uniformity of the density. Results are reported in Table 1.

TABLE 1

| INK | OD | PQ |
|---|---|---|
| 1 | 1.25 | Excellent |
| 2 | 1.24 | Excellent |
| 3 | 1.13 | Excellent |
| 5 | 1.55 | Excellent |

The inks of the invention exhibited neutral black hue and sharp edge acuity. All experimental inks were friendly and reliable in terms of decap or crusting performance and allowed smooth printing for long periods of time.

What is claimed is:

1. An aqueous dispersion comprising:
   (a) an aqueous vehicle,
   (b) a particulate solid, and
   (c) a block polymer dispersant selected from the group consisting of AB, ABA, and BAB block copolymers wherein the A block is hydrophobic, and the B block is hydrophilic, wherein the polymer as a whole has a solubility in the aqueous vehicle of at least 0.1 wt % at 25° C.;
   (d) said block polymeric dispersant being comprised of monomers selected from the group consisting of 2-substituted oxazoline monomers, 2-substituted oxazine monomers, and mixtures thereof.

2. The dispersion of claim 1, wherein the block polymer dispersant comprises a polymer having the following general formula (with the A block represented by formula A and the B block represented by formula B):

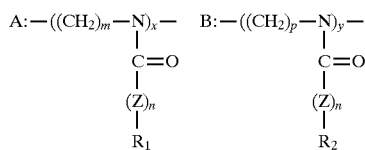

wherein
x is 1–100;

y is 5–500;

y/x is 5–100;

Z is a divalent linking group represented by the formula:

$$R_3(L)_r,$$

wherein

R$_3$ is an alkene, arylene, or aralkylene group containing 2 to 10 carbon atoms, L is O, S, C(O), OC(O), (O)CO, SC(O), or SO$_2$ group and r=0 or 1;

m=2 or 3;

p=2 or 3;

n=0 or 1;

R$_1$ is an alkyl, aryl, aralky, or alkylaryl group containing 4 to 20 carbon atoms; and R$_2$ is an alkyl group containing 1 to 3 carbon atoms, and optionally containing one or more hydroxyl or ether groups.

3. The dispersion of claim 2, wherein x is 1–10, y is 5–100 and y/x is 5–50.

4. The dispersion of claim 1, further comprising at least one organic component selected from the group consisting of organic solvents, polymeric binders, water-soluble polymers, water-dispersible latex emulsions, thickeners, coalescing agents, surfactants, biocides, sequestering agents, thixotropic agents and coating aids.

5. The dispersion of claim 1, wherein the particulate solid is selected from the group consisting of pigments, colloidal silver halide, metallic flake, herbicides, insecticides, and biomaterials.

6. The dispersion of claim 1, wherein said aqueous vehicle is a mixture of water and a water soluble organic solvent.

7. An ink jet ink composition comprising the dispersion of claim 1, wherein the aqueous vehicle comprises a mixture of water and a water soluble organic solvent and wherein the particulate solid is a pigment.

8. The ink of claim 7, wherein the block polymer dispersant has a number average molecular weight of 1,000 to 20,000.

9. The ink of claim 7, wherein the pigment has a size of 0.01 to 5 microns.

10. The ink of claim 7, having the following formulation, based on total weight of the ink:

(a) 70 to 99.8 wt % aqueous vehicle;

(b) 0.1 to 30 wt % pigment; and (c) 0.1–10 wt % dispersant polymer.

* * * * *

UNITED STATES PATENT AND TRADEMARK OFFICE
CERTIFICATE OF CORRECTION

PATENT NO. : 5,854,331
DATED : December 29, 1998
INVENTOR(S) : Ma et al.

It is certified that error appears in the above-identified patent and that said Letters Patent is hereby corrected as shown below:

"Title Page, [75] Inventors: Sheau-Hwa Ma, Chaddsford, PA; Jose N. Rodriguez-Parada, Hockessin, Del." should be amended to read -- Title Page, [75] Inventors: Sheau-Hwa Ma. Chaddsford, PA; Jose M. Rodriguez-Parada, Hockessin, Del. --

Signed and Sealed this

Tenth Day of October, 2000

Attest:

Q. TODD DICKINSON

Attesting Officer

Director of Patents and Trademarks